United States Patent Office  2,922,615
Patented Jan. 26, 1960

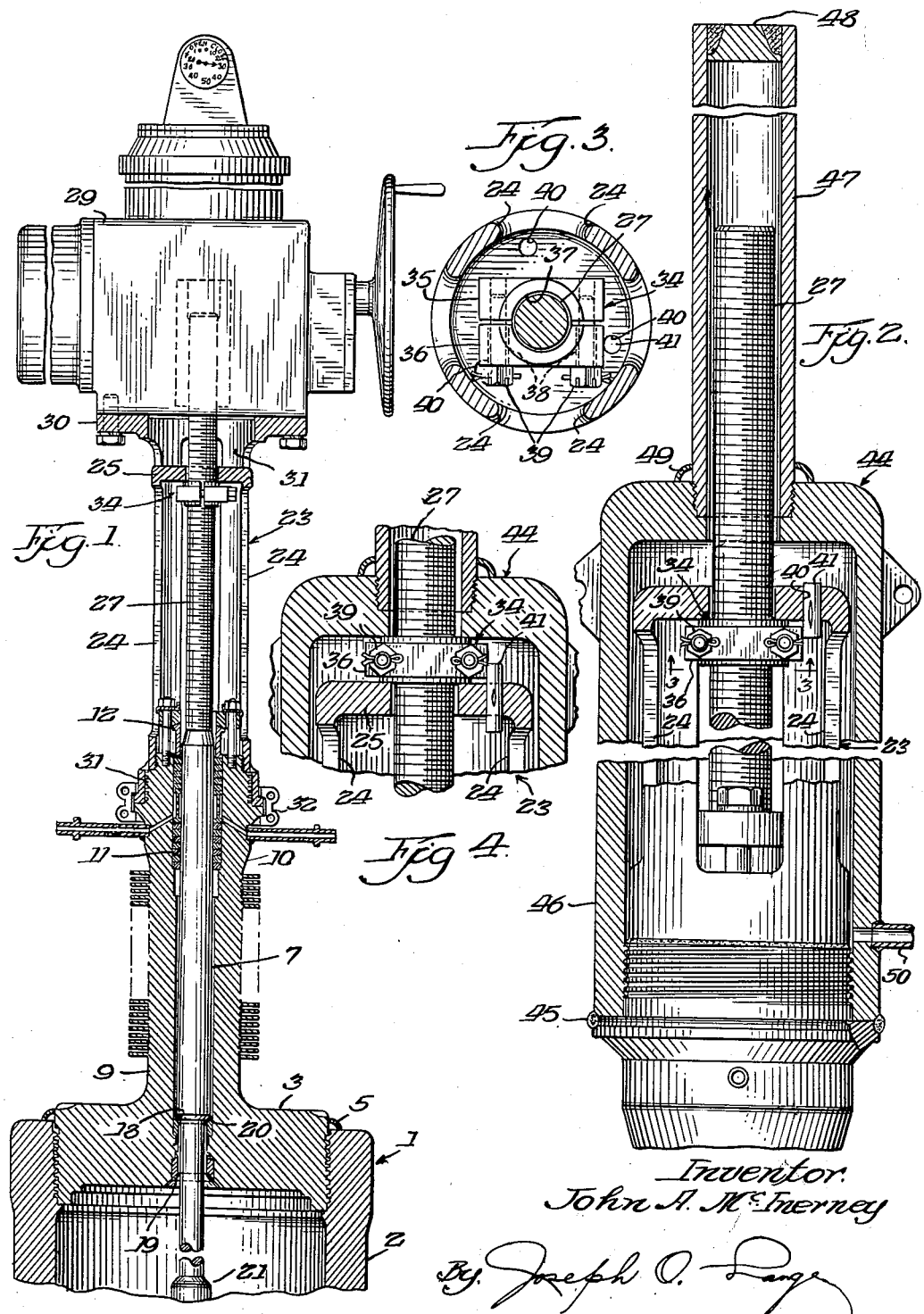

2,922,615

VALVE LOCKING MEANS

John A. McInerney, Evergreen Park, Ill., assignor, by mesne assignments, to the United States of America as represented by the United States Atomic Energy Commission Application June 7, 1956, Serial No. 589,922

5 Claims. (Cl. 251—89)

This invention relates generally to valve actuating means and more particularly it concerns the combination of a valve and stem lock means.

One of the objects of the present invention is to provide means for effectively locking a reciprocally movable valve stem in an end position thereof.

It is a further object to provide means for locking such a valve stem in an end position which will preserve fluid-tight sealing within the valve.

It is still another object to provide means for locking a reciprocally movable valve stem in either end limit of movement thereof so as to preserve fluid-tight sealing within the valve in either end position of the stem.

It is yet another object to provide a valve construction which will facilitate such stem locking.

Still another object is to provide such valve construction in which the valve operator and supporting structure can be removed, after locking of the stem has been effected, and a fluid-tight cap subsequently applied over the stem and upper portion of the valve.

Other objects and advantages will become more readily apparent upon proceeding with the following description read in the light of the accompanying drawings in which:

Fig. 1 is a fragmentary sectional assembly view of a valve employing the present invention;

Fig. 2 is an enlarged view similar to Fig. 1 but at right angles thereto and with the valve operator and supporting structure removed and a fluid-tight cap inserted over the valve stem and other parts;

Fig. 3 is a cross-sectional view taken along the line 3—3 of Fig. 2; and

Fig. 4 is a fragmentary view similar to Fig. 2 but with the locking means applied in another position.

Referring to the drawing figures in detail, the numeral 1 generally designates a valve such as for instance a gate valve having parallel valve seats (not shown) and the usual flow passage extending therethrough (also not shown). The valve casing within which the seats are provided consists of a body portion 2 and a bonnet or enclosing portion 3 received within the latter as by means of threading shown in the drawing. A ring member 5 is welded to the body and bonnet at its outer and inner peripheries so as to provide a fluid-tight connection between the said body and bonnet portions of the valve. Extending through the center of the bonnet is a reciprocally movable valve stem 7 on the lower end of which is mounted a valve disc or gate closure (not shown) for cooperation with the parallel body valve seats referred to previously.

The bonnet 3 is provided with an upwardly extending hollow portion 9 equipped with a stuffing box 10 containing a suitable type of packing 11 secured by means of a gland 12. Below the stuffing box, the bonnet is provided with a pair of ring members secured within the bonnet as by means of welding, these ring members presenting upwardly and downwardly facing frusto-conical seat surfaces 18 and 19 which may consist of hard metal inserts as shown in the drawing. The valve stem is provided with upper and lower frusto-conical seat surfaces 20 and 21 to define a reduced portion therebetween. It will be understood that said surfaces provide for fluid sealing engagement respectively with the upper and lower seat surfaces 18 and 19 of the bonnet at opposite end limit positions of the valve stem.

The bonnet is also provided with a yoke generally designated 23 attached thereto by means of threading at the bottom. Such yoke comprises spaced yoke arms 24 and a solid portion 25 connecting the said arms at the top. The latter portion is provided with a smooth bore in the center for passage of a threaded portion 27 of the valve stem freely and uncontactingly therethrough in reciprocal movement. It should be pointed out at this point that the valve stem is connected to the closure member (not shown) in such a way as to prevent rotation of the said stem, thus providing a nonrotatable valve stem.

A valve operator generally designated 29, in this case a motor operator, is provided at the upper end of the valve. This motor operator is supported on an outer yoke member 30 threadedly engaging the bonnet at 31 at the bottom. A split clamping member 32 is provided for insuring tight engagement between this yoke member and bonnet. The latter yoke member, which extends outwardly of and over the yoke 23, likewise includes spaced yoke arms 31, in this case four in number, which are positioned in the mounted relation outwardly of and in line with each of the four yoke arms 24 of the inner yoke member 23. This is for the purpose of providing access into the inner yoke for the purpose now to be explained.

It will be seen that the valve stem is in the lowermost end position in Figs. 1 through 3, representing fluid sealed engagement between seating surfaces 18 and 20 of the bonnet and stem respectively. As shown in these figures, stem lock means generally designated 34 is provided to secure the stem in this position for a purpose which will become apparent below. This lock means is made up of multiple parts passable between the inner and outer yoke arms 24 and 31 of the inner and outer yokes, respectively, and assemblable on the valve stem. In the present instance these parts comprise opposing halves or segments 35 and 36 forming in assembled relation as shown in Fig. 3 a threaded bore 37 for rotational threaded engagement on the stem threading 27. The locking halves 35 and 36 are adapted to be retained together on the threaded stem by means of studs 38 threadedly received within one of the halves designated 35 and over which the other half, designated 36, is loosely placed. Nuts 39 are then threaded onto the outer ends of the studs for bringing the two halves into proper threaded relation with the stems, so as not to prevent easy rotation thereon. Cotter pins are then inserted through the nuts and studs to preserve this relation as shown in the drawing figures. It should be noted from Fig. 3 that a certain amount of space or clearance exists between the two locking halves so as to insure the proper threaded engagement on the threaded stem.

The locking member is mounted on the threaded portion of the stem in the manner above related in any convenient location below the solid or spanning portion 25 of the inner yoke. After such attachment, the locking member is then conveniently rotated in the proper direction within the inner yoke arms 25 to bring the same into tight abutting engagement with the undersurface of the yoke portion 25. Tightness is preferably assured by a certain amount of tapping by a hammer or other tool, the purpose being to take up any looseness and assure retention of the sealing surfaces 18 and 20 in tight engagement for an operation to be described below. In preventing loosening of the locking member by means of rotation as a result of vibration, for instance, an expanded pin 41 is driven into the proper opening 40 in the top of the yoke and partly therethrough so as to be engaged by one of the sides of the locking member as shown more clearly in Fig. 3.

In valves in which hazardous fluids such as radio-active liquids are conducted, the utmost precautions are necessary in order to prevent injury to personnel. In the conduction and control of such fluid, it is therefore desirable to provide auxiliary means of insuring against leakage through valve packing and even between sealing surfaces such as 18 and 20 of the bonnet and stem. This is even more desirable and essential when the liquid being conducted is of a relatively high temperature, which results in cooling of valve parts after closing of the valve or expansion of parts after opening of the valve. Where seating surfaces 18 and 20 between the bonnet and stem are in perfect fluid-tight sealing when the gate valve is first closed, after the passage of time and cooling has taken place contraction will result, which will expose the packing 11 to the hazardous fluid.

As is common knowledge, a certain amount of leakage takes place through even new packing under perfect conditions. It is therefore deemed necessary to provide such auxiliary or precautionary sealing means as the cap member 44 shown in Fig. 2. Before this cap member can be so applied over the valve stem and inner yoke member, however, it is necessary that the valve operator and outer yoke member, 29 and 30 respectively, be removed from the bonnet after first loosening the clamp member 32. After withdrawal of the clamp and unthreading of the outer yoke 31 from the bonnet, the motor unit and outer yoke is lifted from the bonnet and stem. The fluid tight cap 44 is then placed over the locked stem and inner yoke and engaged on the same threads 31 that the outer yoke had previously engaged. The cap member is further welded at 45 around the periphery of the bonnet in order to insure fluid-tight sealing.

The cap member 44 comprises a body portion 46 surrounding the inner yoke 23 and an upward extension 47 of tubular form having a welded top 48, extending around and enclosing the upper end of the threaded valve stem. The tubular portion 47 is threaded into the body portion of the cap as shown and is preserved in fluid-tight sealing by means of a ring member 49 welded at its inner and outer peripheries between the tube and body portion of the cap.

In valves that may be in the open or closed position for prolonged periods of time and not subject to frequent operation, the cap member may finally become filled with the hazardous fluid under line pressure. In this case the cap can be bled and drained through the lower drain tube 50 prior to removal of the cap and remounting of the motor operator and outer yoke for movement of the valve closure into the opposite position.

Fig. 4 shows the application of the locking means 34 to the valve stem when in the opposite or uppermost position as representing sealing engagement between seating surfaces 19 and 21 of the body and stem. The locking means in this case is inserted between the outer yoke arms 31 and is assembled on the valve stem above the inner yoke 23. This member is assembled in the same way as before, except that after assembly it is rotated downwardly into tight stress taking abutting engagement with the upper surface of the spanning portion 25 of the inner yoke so as to permit subsequent removal of the motor operator and outer supporting yoke 29 and 30 respectively, from the valve without loosening of the sealing engagement between stem and bonnet. The expanded pin 41 is of course driven into the proper opening 40 prior to such removal for the same purpose as explained in connection with Figs. 2 and 3. After removal of the valve operator and supporting structure, the cap unit 44 is then mounted on the bonnet over the valve stem and inner yoke member in fluid tight, pressure retaining relation also as pointed out in connection with Figs. 2 and 3.

One of the features of the present construction is that the locking ring 34 may be employed for repacking of the valve after removal of the cap 44. Where the valve has been capped for a period of time and then reopened, the packing may be found to be leaking excessively. In many cases the packing may be so deteriorated and the gland already so tightened that further tightening of the gland nuts is ineffective to stop the leakage. In the present instance, however, the leakage can be promptly stopped, thus limiting the amount of contamination, and repacking be quickly and immediately effected by merely knocking out the expanded pin 41 and striking the locking ring 34 so as to turn it more firmly against the top portion 25 of the yoke. This will force either of the stem sealing surfaces 20 or 21 into fluid sealed, nonleaking relation with the bonnet seat surfaces 18 or 19, depending upon the position of the valve stem and locking ring 34. Repacking may then be effected after which the motor operator can be mounted and the valve moved into the opposite position, in complete safety.

It is of course evident that the valve may be used in any position and that such terms as "upper," "lower," "top," "under" or the like are merely relative to the position shown in the drawing.

Although seating has been shown between the valve stem and bonnet, this relation is not absolutely essential as in some valve constructions fluid-tight sealing may be had between the closure member and valve seats on the opposite end positions of the closure member.

It should also be understood that the disclosed construction and arrangement is but one form of the present invention and that other embodiments and constructions are contemplated within the terms of the appended claims which should be liberally construed.

I claim:

1. In combination with a valve comprising a casing and a yoke on the casing with a portion connecting the yoke arms having an aperture therethrough, a nonrotatable longitudinally reciprocable valve stem projecting from the casing through the connecting portion aperture in clearance relation therewith having a threaded portion extending adjacent the connecting portion, a pair of oppositely directed seats in the casing about said stem, a pair of sealing surfaces on the stem each engageable with one of said seats to determine an end position of the stem and to seal against leakage thereabout in the stem position determined thereby, separable-section threaded lock means attachable in threaded non-sliding relation on said threaded stem portion selectively in engagement against one side of the connecting portion in one end position of the stem to prevent stem movement toward the other end position and in engagement against the other side of the connecting portion in the other end position of the stem to prevent stem movement toward said one end position, and means projectable transversely of the plane of said lock means in engagement with the lock means and connecting portion to prevent rotation of the lock means.

2. In combination with a valve comprising a casing and a yoke on the casing with a portion connecting the arms thereof having an aperture therethrough, a nonrotatable longitudinally reciprocable valve stem projecting from the casing through the connecting portion aperture in clearance relation therewith, a pair of oppositely facing seats in the casing about said stem, a pair of sealing surfaces on the stem each engageable with one of said seats to determine an end position of the stem and seal against leakage about the stem in the stem position determined thereby, separable lock means attachable in positively axially non-slidable relation on the stem selectively wholly to and in engagement with one side of the connecting portion upon engagement of one of said sealing surfaces with the corresponding seat to prevent stem movement from the end position determined thereby and wholly to and in engagement with the other side of the connecting portion upon engagement of the other sealing surface with the other seat to prevent stem movement toward the other end position, and means projectable transversely of the plane of the lock means for engagement with the lock means and connecting portion to prevent rotation of the lock means.

3. In combination with a valve comprising a casing and a yoke on said casing having connecting the arms thereof a portion with an aperture therethrough, a nonrotatable valve stem projecting from the casing through the aperture of said connecting portion and longitudinally reciprocable between two end positions, a pair of oppositely directed seats in the casing about said stem, a pair of oppositely disposed sealing surfaces formed on the stem each engageable with one of said seats to determine an end position of the stem and seal against leakage thereabout in the stem position determined thereby, and separable lock means attachable in positively axially non-slidable relation on said stem selectively in engagement with one side of said connecting portion upon engagement of one of said stem sealing surfaces with the corresponding casing seat to prevent movement of the stem from the position determined thereby and in engagement with the other side of the connecting portion upon engagement of the other stem sealing surface with the other casing seat to prevent movement of the stem from the other determined position.

4. In a valve comprising a casing and a yoke on said casing with a portion connecting the yoke arms having an aperure therethrough, a nonrotatable valve stem projecting from the casing through said aperture in clearance relation therewith and longitudinally reciprocable between opposite end positions, separable lock means attachable in positively axially nonslidable relation on said stem selectively wholly to and in engagement with one side of said connecting portion in one end position of the stem to prevent stem movement toward the other position and wholly to and in engagement with the other side of the connecting portion in the other end position of the stem to prevent stem movement toward said one end position, and means to secure said lock means in said nonslidable relation.

5. A valve comprising a casing, a valve closure within the casing, a longitudinally reciprocable valve stem for said closure in said casing and projecting therefrom, a member having an aperture therethrough fixed in spaced relation to the casing with said stem extending in clearance relation through said aperture, a pair of spaced oppositely directed seats in the casing about the stem, a pair of seating surfaces on the stem each engageable with one of said seats to determine an end position of the stem and seal against leakage thereabout in the stem position determined thereby, and separable lock means attachable in positively axially non-slidable relation on the stem selectively in engagement with one side of said member about the aperture in one end position of the stem to maintain tight sealing contact of a seat and seating surface and in engagement with the other side of said member in the other end position of the stem to maintain tight sealing contact of the other seat and seating surface.

References Cited in the file of this patent

UNITED STATES PATENTS

| | | |
|---|---|---|
| 685,396 | Dexter | Oct. 29, 1901 |
| 1,413,502 | Steinmetz | Apr. 18, 1922 |
| 1,740,319 | Stancu | Dec. 17, 1929 |
| 1,799,143 | Bailey | Apr. 7, 1931 |
| 1,827,574 | Frazier | Oct. 13, 1931 |
| 2,206,707 | Shaw | July 2, 1940 |
| 2,462,809 | Craene | Feb. 22, 1949 |
| 2,610,820 | Market | Sept. 16, 1952 |
| 2,733,041 | Crookston | Jan. 31, 1956 |

FOREIGN PATENTS

| | | |
|---|---|---|
| 8,759 | Great Britain | Apr. 17, 1903 |
| 4,581 | Great Britain | Mar. 6, 1905 |